March 17, 1931.  E. W. WEATHERS  1,796,585

COMBINATION VEHICLE WHEEL SUPPORTING AND ELECTRIC CONDUIT MEANS

Filed Nov. 19, 1926

INVENTOR.
EATHELBERT W. WEATHERS
BY A.B.Bowman
ATTORNEY

Patented Mar. 17, 1931

1,796,585

UNITED STATES PATENT OFFICE

EATHELBERT W. WEATHERS, OF SAN DIEGO, CALIFORNIA

COMBINATION VEHICLE WHEEL-SUPPORTING AND ELECTRIC-CONDUIT MEANS

Application filed November 19, 1926. Serial No. 149,503.

This invention relates to a combination wheel supporting and wire conducting means particularly suitable for use on motor vehicles of the gas electric or electric type.

The objects of the invention are: first, to provide a wheel supporting and wire conducting means for electric motor vehicles, which will occupy the same position on such vehicles that is occupied by the rear axle and housing, the propeller shaft and rear end of the transmission shaft and housing of a conventional gas driven automobile, for supporting the vehicle wheels, imparting the torque of the wheels to the frame, and for serving as a conduit for electric wires leading to electric motors on or in connection with the wheels; second, to provide a means for supporting the wheels and conducting the wires of an electric automobile which will allow the free up and down movement of the frame relative to the wheels of the automobile and at the same time take all bending, twisting and other strains off the wires passing therethrough, and third, to provide a means of the character stated which will be particularly simple in construction and practical and efficient in operation.

Figure 1:
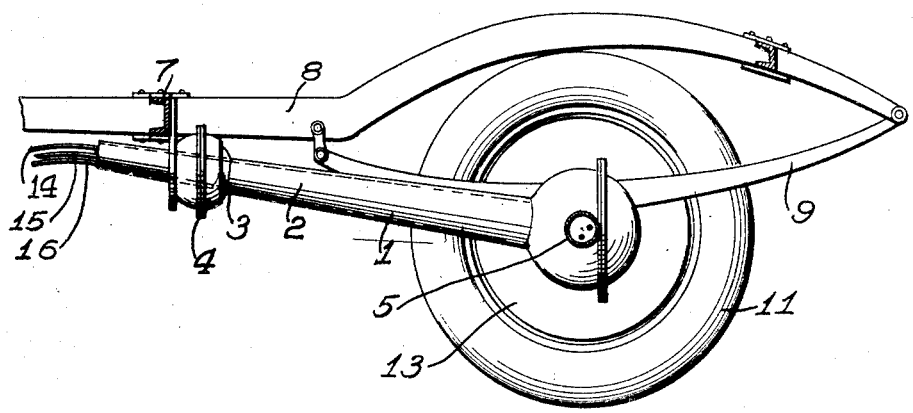
Figure 2:
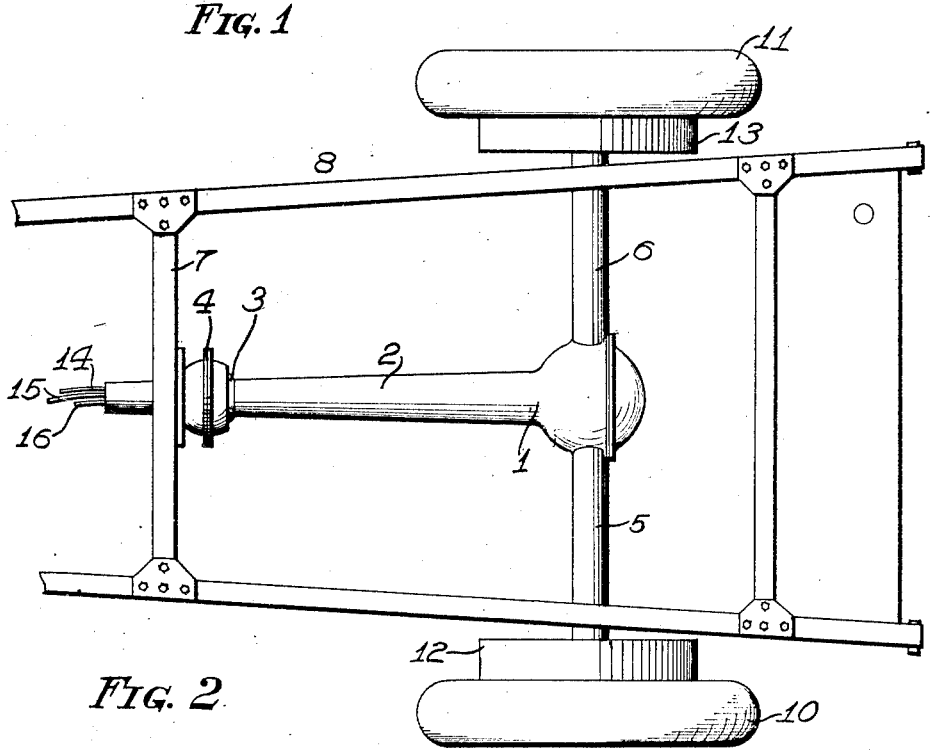

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevation of the rear half of the chassis of an automotive vehicle embodying my invention, and Fig. 2 is a plan view of the chassis of the vehicle and my invention as shown in Fig. 1.

Similar characters of reference refer to similar parts in all the figures.

My invention comprises a T-shaped tubular element 1 formed with a main longitudinal and forwardly extending tubular member 2, ball portion 3, spherical socket 4, and a pair of tubular members 5 and 6 extending from the rear end of the member 2 to the opposite sides thereof and at right angles thereto. Near the forward end of the member 2 is secured the ball portion 3, which is loosely and movably mounted in the spherical socket 4 mounted in a cross bar 7 of the automobile frame 8. The socket 4 has a forwardly extending tubular portion which, with the socket portion, is rigid relative to the frame 8. Thus the member 2 is connected by a ball joint with the frame of the automobile and flexibly retained thereby. The main tubular member 2 occupies the position of the propeller shaft, while the members 5 and 6 occupy the position of the rear axle of a gas driven automobile. The rear springs 9 of the automobile resiliently support the frame upon the rear tubular members 5 and 6. The rear wheels 10 and 11 of the automobile are journaled on the ends of the rear tubular members 5 and 6 in any suitable manner. Electric motors 12 and 13 form a part of the rear wheels 10 and 11, respectively, for driving said wheels, or the motors may be mounted on the axle or members 5 and 6 and mechanically connected with the wheels for driving the same.

The electric wires 14, 15 and 16 extend through the rigid tubular and socket portions 4 into the ball portion 3 and tubular members 2, 5 and 6 to the motors 12 and 13.

The ball joint, referred to, allows the frame 8 to move up and down with relation to the rear members 5 and 6 and the rear wheels 10 and 11, and relieves the wires 14, 15 and 16 of any severe vibration, twisting or bending.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A combination wheel supporting and wire conducting means for electric motor vehicles flexibly connected to the vehicle frame, comprising a tubular element formed with a longitudinal tubular member pivotally connected at its forward end to said frame, and a pair of rear tubular members extending transversely from the rear end of said longitudinal member and respectively carrying the rear wheels and the electric motors for driving said wheels, and electric wiring conducted through said tubular element from said forward end to said motors.

2. A combination wheel supporting and wire conducting means for electric motor vehicles flexibly connected to the vehicle frame, comprising a tubular element formed with a main longitudinal tubular member, a short tubular member mounted on the automobile chassis, a ball and socket joint pivotally connecting the rear end of said short tubular member and the forward end of said main tubular member, and a pair of rear tubular members extending transversely from the rear end of said main longitudinal tubular member and respectively carrying the rear wheels and the electric motors for driving said wheels, the electric wiring being conducted through said ball and socket joint and tubular element to said motors.

3. In an automotive vehicle, a frame, a combination wheel supporting and wire conducting means positioned at and flexibly connected to the rear portion of said frame and comprising a tubular element formed with a longitudinal tubular member pivotally connected at its forward end to the central portion of said frame and a pair of rear tubular members extending transversely from the rear end of said longitudinal member and towards the opposite sides of said frame, and electric driven vehicle supporting wheels revolubly mounted at the outer ends of said rear tubular members, said element serving to enclose, conduct and protect electric wires extending from the forward pivoted end of said longitudinal tubular member to motors for driving said wheels.

In testimony whereof, I have hereunto set my hand at San Diego, California, this 13th day of November, 1926.

EATHELBERT W. WEATHERS.